INVENTORS
LEONARD L. HORNER JR.
BY JAMES L. CROSS

ATTORNEY

INVENTORS.
LEONARD L. HORNER JR
BY JAMES L. CROSS

ATTORNEY

INVENTORS
LEONARD L. HORNER JR.
JAMES L. GROSS
BY
Ostrolenk, Faber,
Gerb & Soffen
ATTORNEYS

United States Patent Office 2,901,686
Patented Aug. 25, 1959

2,901,686

REMOTE CONTROL CIRCUIT AND COMPONENT

Leonard L. Horner, Jr., Atlanta, and James L. Cross, Decatur, Ga., assignors to I-T-E Circuit Breaker Company, Philadelphia, Pa., a corporation of Pennsylvania Application April 1, 1957, Serial No. 649,914

7 Claims. (Cl. 323—114)

This invention relates to a remote control circuit and component and especially to an arrangement of electrical elements into a novel relay A.C. control transformer applicable in circuit to control a switch or the like from a remote point by the use of a single wire and the usual A.C. current supply.

A device such as herein described has particular application where it is desired to control something at a distant point by electrical means and may be used as a remote control element in a circuit for switching channel selectors, controlling machine operation in or out of sequence from a remote point, or for selecting switch positions in a remote switch as described herein for illustration, or many other uses. For purposes of describing the present circuit and the novel control component therewith, there is included in the following specification and drawings a disclosure of one application of the present invention in a control circuit for a remotely controlled switching unit as is commonly found in use in a U.S. Navy JY system. The motor drive unit or switch unit per se forms no part of the present invention and is included for purpose of clarity and better understanding of one application of the novel control component and its circuit.

Commonly found in such conventional switching apparatus is a transformer switching unit at one spot energized from a line supply and a controlled transformer switching unit at a remote point with a servo motor and gear drive responding to changes in current to drive in one direction or the other until a desired position is reached. The present invention presents a novel sort of control transformer for operating a polarized relay and a circuit arrangement to control the servo motor in one direction or the other and the present control transformer is in circuit by one wire with the switching unit to recognize a control potential with respect to varying magnitude and phase in such a way as to use that variation to operate the relay to drive the motor and therefore the switch and to balance at the correct point of the remotely controlled switch. The present device and circuit replaces the old motor and relay control unit which formerly actuated and operated the servo motor.

The application shown in this specification is for a particular Navy JR switch panel and operates on a three-phase, 115 volt supply. The transformer unit of this invention can be used and readily designed to drive other switches, to operate other voltages, and to operate on a single-phase or two-phase supply as well as three-phase.

The object of the control system is briefly to transmit over a single wire an A.C. voltage which when properly interpreted by a control device both as to magnitude of voltage and phase relation to the basic line voltage supplying the remote control transformers and the drive unit, will cause the drive unit to "track" the control switch both as to position and direction of rotation.

Generally described, without limitation on scope of coverage found in the claims, the controlling switch with its transformer energized from the line is connected by a wire through the present transformer device to the controlled switch unit and its transformer also energized from the line. The transformer device consists of a basic or reference winding with primary and secondary winding, a control phase winding in the lead from the controlling switch to the controlled switch assembly tap is normally without potential and the control winding has three secondary windings adapted to be energized by and from the energization of the control phase winding when it is energized, and subject to changes from said primary winding one of the secondary windings responds to a change in voltage to light a signal light, another winding is connected in the same voltage direction with the secondary winding of the primary or reference winding and becomes additive therewith and with a rectifier then leading to a terminal for connection to a relay or the like, the other secondary winding connects with the secondary winding of the primary reference winding in an opposite voltage direction therewith and becomes subtractive therefrom and is connected with a rectifier to a terminal for connection to the same relay, the relay is connected to operate a current responsive device such as the drive motor of a switch unit. The motor will drive the controlled switch in response to the movement of the controlling switch. As long as there is a neutral or balanced voltage in the control wire or line, the control-phase winding of the control transformer is balanced with the reference winding and the relay is at normal or neutral position and the driving motor is at rest. This occurs when the controlling switch and the controlled switch are both in the same position. However, movement of the controlling switch in either direction produces a change in voltage in the control wire and therefore in the control-phase winding which energizes and produces voltages in the secondary windings. One voltage will be the same phase as the reference winding and will add thereto and the other will be out of phase and subtract therefrom. The larger voltage rectified and the smaller voltage rectified and both applied to the relay windings will pull the relay in one direction which in turn energizes the motor in circuit therewith thereby driving the switch drive motor until the switch reaches a position corresponding in potential to the one initially selected on the controlling switch, at which time the voltage again becomes balanced in the control wire and the control-phase winding returns to zero.

An object of this invention is to provide a relationship of electrical elements in an A.C. control device for controlling a responsive switch or the like at a distance from the control point.

An additional object of this invention is to present an arrangement of control circuit for an A.C. operation whereby changing potential at the control point causes a change in the controlled device to return the system to balance or new position.

A further object resides in the means for receiving a change in A.C. voltage in a single control wire and for the balancing of that change through the controlled transformer which changes to a position corresponding in voltage to the one selected in the control change.

Other and further objects and advantages of my invention will be apparent upon reading the following description taken in conjunction with the accompanying drawings, wherein.

Figure 1:
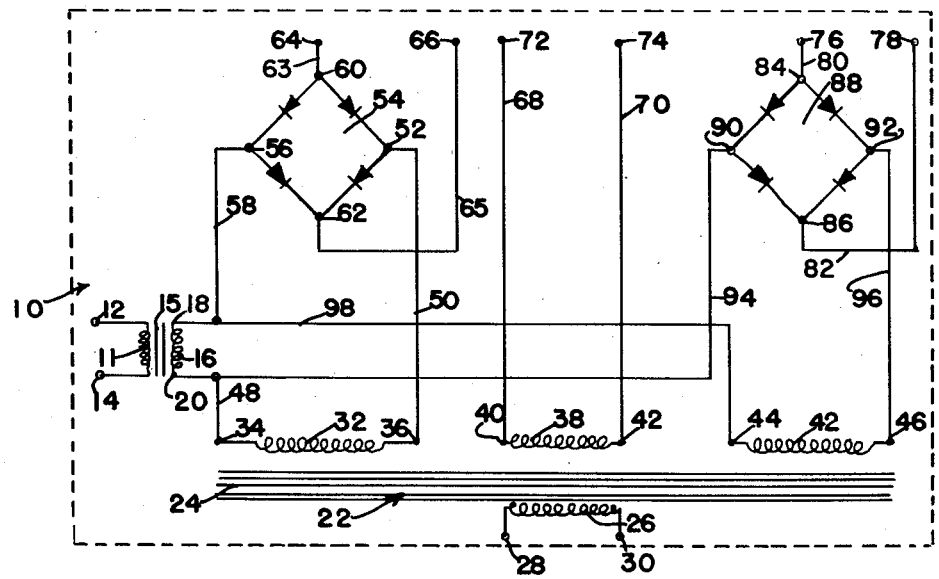
Fig. 1 is a circuit diagram of the novel A.C. control transformer of my invention which forms a part of a control circuit.

Referring to Fig. 1, the control transformer arrangement of the present invention consists of a basic or reference winding 11 with taps 12, 14 and having a core 15 with secondary winding 16 with taps 18, 20. Taps 12, 14 connect with the line current. A control phase transformer 22 with a core 24 has a primary control-phase winding 26 with taps 28, 30 and has three secondary windings: first winding 32 with taps 34, 36, second winding 38 with taps 42, 40 and the third windings 42 with taps 44, 46. Tap 34 of winding 32 connects by wire 48 with tap 20 of winding 16; the tap 36 connects by line 50 with one terminal 52 on a rectifier 54 and another terminal 56 thereof connects by wire 58 with tap 18 of winding 16. The other terminals 60, 62 of the rectifier 54 lead by respective wires 63, 65 to a respective terminal 64, 66. Wires 68, 70 from a respective tap 40, 42 also lead to terminals 72, 74 and a third set of terminals 76, 78 have wires 80, 82 connected thereto which lead respectively to respective terminals 84, 86 on another rectifier 88. The other terminals 90, 92 of rectifier 88 lead through respective wires 94, 96 to taps 20 and 46. Tap 44 connects by line 98 to tap 18 of winding 16.

Figure 2:
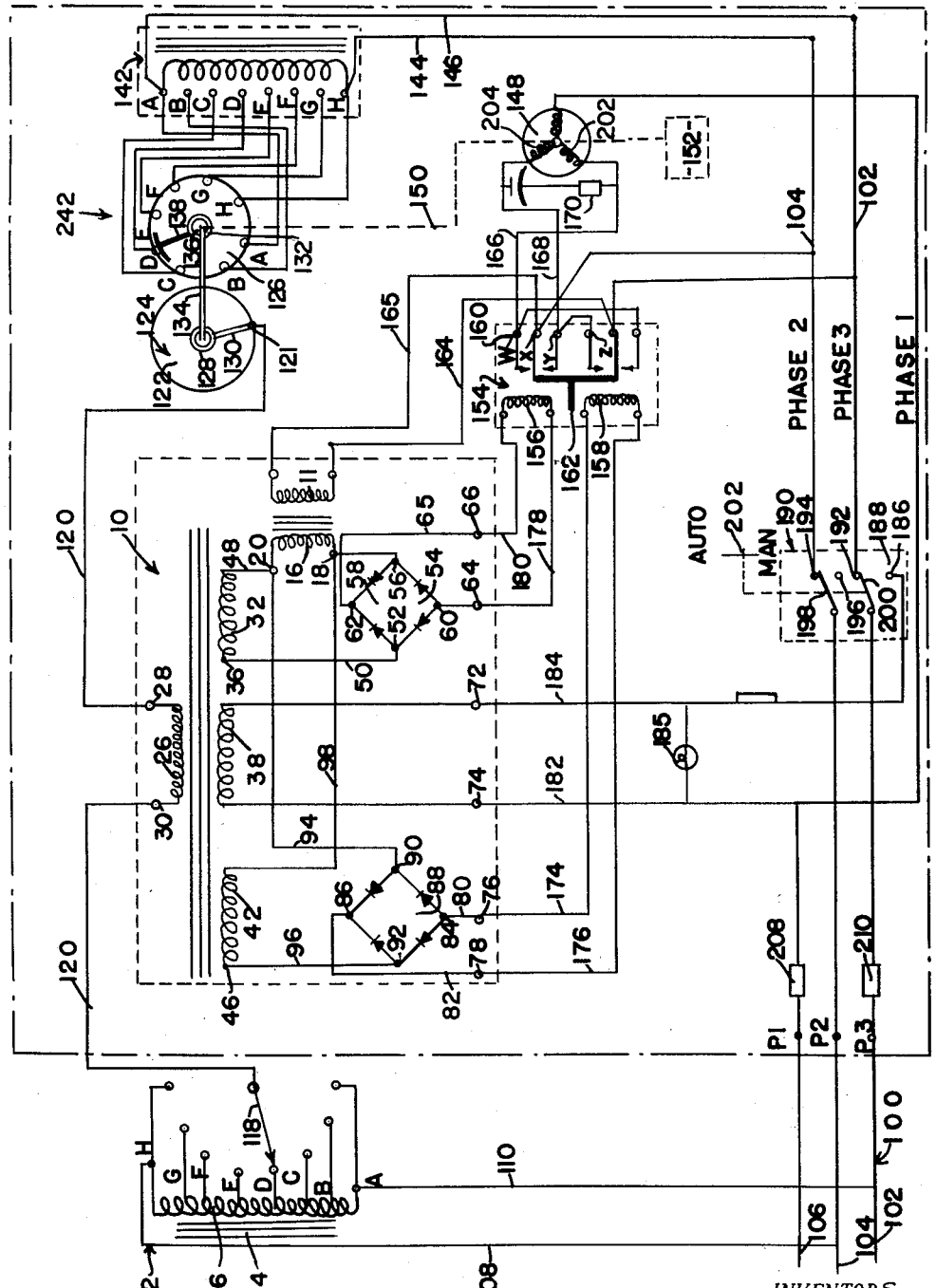
Fig. 2 is a circuit diagram with electro-mechanical elements in circuit therein and showing one application of the control transformer device in a control circuit for controlling a multi-position switch from a distance.

With the line voltage reference connected to reference winding 11 at taps 12, 14 and with a control wire connected with control referenec primary winding 26, a change in voltage in winding 26 will cause a voltage in the secondary windings 32, 38, 42 which is rectified by 54, 88 to be applied to an element such as a relay for selectively operating the relays as more readily understood and therefore described in conjunction with an actual control circuit in Fig. 2.

The foregoing relay control transformer 10 may be enclosed as a unit in a suitable case or housing and is represented by dotted lines in Fig. 2 within a larger casing represented by alternate long and short lines. A suitable A.C. line current (herein shown as a three phase, three wire current 100 with wires 102, 104, and 106) has connected thereto at one point by leads 108, 110 a transformer switch 112, with a core 114 and winding 116 and eight (8) selective switch positions A through H. The switch selector 18 is connected to the basic control wire 120 of the present circuit which has the primary winding 26 in series by connection to taps 30, 28 and then leads and connects to terminal 121 on one element 122 of a rotary switch mechanism 124 which has a second switch element 126 connected mechanically thereto by means of a first commutator ring 128 on element 122 connected by link 130 to terminal 121 and a second slip ring 132 connected by connector 134 to ring 128. Element 126 has a rotor 136 therein with switch arm 138 rotatably mounted therewith to move from a series of switch selector point terminals A through H corresponding to the respective positions on the control switch 112. Switch contacts A through H connect with a respective position on a terminal strip of a controlled transformer 142 energized by wires 144, 146 from the same phases 102, 104 as transformer 112. A motor 148 is connected by suitable gear train drive 150 (see Figs. 3 and 4) to drive the rotor 138 and actuate the switch unit 152 having terminals thereon from which various controlled components (not shown) can be operated thereby.

Motor 148 and switch unit 152 are controlled to the correct switched position A through H by means of the control transformer unit 10 in conjunction in this particular application with a polarized relay 154 having first winding 156 and second winding 158. Relay 154 is a balance D.C. polarized device with contacts 160 arranged as W, X, Y, and Z, and an armature 162 movable in accordance with pull of the windings 156, 158 from one contact position to the other.

Reference winding 11 is energized by wire 164 from phase 102 through contact Z and returning by wire 165 through contact X back to the other phase 104. Contacts W and Y lead respectively by lines 166, 168 to respective windings on the motor 148. A resistor 170 and a capacitor 172 between wires 166, 168 at motor 148 function as a filter to reduce the arcing at the contacts of the relay 154 during make and break thereof.

Terminals 76, 78 connect respectively by wires 174, 176 to winding 158. Terminals 64, 66 connect respectively by wires 178, 180 to winding 156. Terminals 74, 72 connect by wires 182, 184 respectively to the phase 106 and to the contact 186 on terminal switch panel 188 of switch 190 and have an indicator lamp 185 therebetween. Also with the switch 190 are contacts 192, 194 for respective lines 102, 104 and a neutral contact 196. Switch contact arms 198, 200 operate between contacts by means of manual lever 202 which will switch the unit from manual to automatic. In "automatic" is, of course, the only time the control circuit of this invention is used.

Operation

The operation of the novel transformer device 10 of this invention and the control circuit of Fig. 2 arises when the switch 190 is in auto and it is desired to control the switch unit 152 from a distant point where switch 112 is located. In the "manual" position of switch 190 lamp 185 is on and while this lamp is "off" in set position with switch 190 in "auto" the lamp 185 will flash momentarily when turning from one switch position to another position by auto control. If the lamp 185 remains "on" after switching automatically, it is a sign of "trouble."

With switch 190 in "auto" position, one phase of the 115-volt, 3-phase, 60 cycle supply is applied across the reference phase winding 11 of the unit 10. Transformer 142 is also energized from the same phase as controlling transformer 112. Assuming that it desired to move the controlled switch 152 from whatever position it is in to some other position in order to effect whatever operation that will occur at that position (for example, to move a machine element from one movement to the next) and to do this from a remote point where switch 112 is located, switch arm 118 is rotated, for example, in a clockwise direction as when going from C to D. This displacement produces a difference in voltage between the taps of the controlling switch 112 and the controlled switch assembly 124 tap 121 and the taps on part 126. This small potential is applied across the control-phase winding 26 of unit 10, and this potential produces three voltages in the secondary windings 42, 32, and 38 as follows:

a. Voltage in winding 32 out-of-phase or opposing voltage in winding 16.

b. Voltage in winding 42 in-phase or adding to voltage in winding 16.

c. Voltage in winding 38 sufficient to light the synchronizing lamp 185.

When this occurs, the net voltage of winding 16 minus the voltage of winding 32 is rectified by rectifier 88 and applied to the winding 156 of the balanced neutral-position D.C. polarized relay 154. This weakens the pull of the relay winding 156. Similarly, the net voltage of winding 16 plus winding 42 is rectified by rectifier 54 and applied to winding 158 of relay 154. This strengthens the pull of relay winding 158 and the combined increase and decrease in pull of the two relay windings 154, 156 causes the relay armature to move from the neutral position to a new position closing the contacts W and Z and X and Y. With the relay contacts in this position, windings 202 and 204 of motor 148 are energized by phases 102 and 104, respectively, and the motor rotates in a clockwise direction driving both the switch assembly 124 and arm 138 and the driven switch 152 to a position corresponding to the designated position selected initially on switch transformer 112. Switch 152 moves directly the shortest distance around and does not make an entire rotation.

When the switch assembly 122, 124, 126 have arrived at the designated position by the shortest travel, the voltage across the 26 winding of unit 10 is reduced to zero (the voltage becomes balanced in line 120 between transformer switch 112 and transformer switch 142) and the voltages in windings 32, 38, and 42 are reduced to zero. Lamp 185 goes out. A balanced voltage of winding 16 is on each of the relay 154 windings thereby restoring the relay 154 armature 162 to neutral. Power is thereby terminated to windings 202, 204 of the motor 148 controlled by relay 154. The switch 152 detents (not shown) will accomplish final and exact positioning of the switch.

A counter-clockwise displacement of the controlling switch 112 produces reverse voltage on windings 42, 32 and 38 of unit 10. These voltages reverse the action of the contacts on relay 154 causing servo motor 148 to rotate in a counterclockwise direction. The switch assembly 124 and the switch 152 are simultaneously driven to the designated position called for by the controlling switch 112. The unit 10 and relay 154 then return to the neutral position and this removes the voltage from two of the motor phases. If the switches 112 and 142 fail to synchronize after a movement to a new position, a fault or difficulty in the control circuit is indicated by light 185 and manual operation is used until the trouble is cleared.

With the switch 190 in "Man" position, power is removed from the circuits of the remote control assembly and the switch 152 may be operated manually by the handle 206. The fuses 208, 210 are time lag fuses to protect motor 148.

Figures 5, 6:
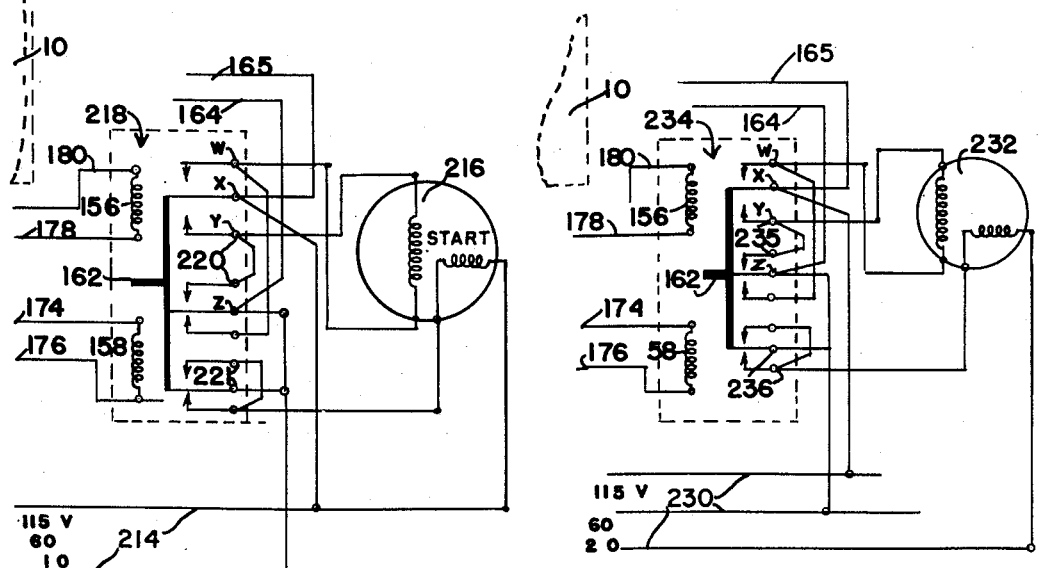
Fig. 5 is a circuit diagram of a modification in the circuit of Fig. 2 to operate with present control invention on a single phase line with a single phase motor.
Fig. 6 is another modification of the circuit in Fig. 2 to operate with the present invention on a two phase motor and current.

While I have shown the device for use with the switch unit 124 and switch 152, other arrangements may be made within the scope of my invention. Also, while I have shown the control circuit used with a line supply of 115 volt, 3-phase, 60-cycle and the three phase motor, other line supply may be used and other motors. For example, Fig. 5 shows a single phase line 214 with single phase motor 216 and a relay 218 receiving at its coils 156, 158 the lines 174, 176 and 178, 180 and having its contacts 220–W, X, Y, Z and additional contacts 221 wired to the motor 216, to line 214, and to wires 164, 165. Likewise, Fig. 6 presents a two phase supply 230 with a two phase motor 232 and a relay 234 wired with its coils 156, 158 connected to lines 178, 180 and 174, 176 and its contacts 235–W, X, Y, Z, and extra contacts 236 connected to lines 165, 164 and line 230 and motor 232 to receive control from unit 10. The operation of control unit 10 and the control circuit is the same in Figs. 5 and 6 as in Fig. 2. Forward and reverse depends on the direction of the armature 162 movement.

Figure 3:
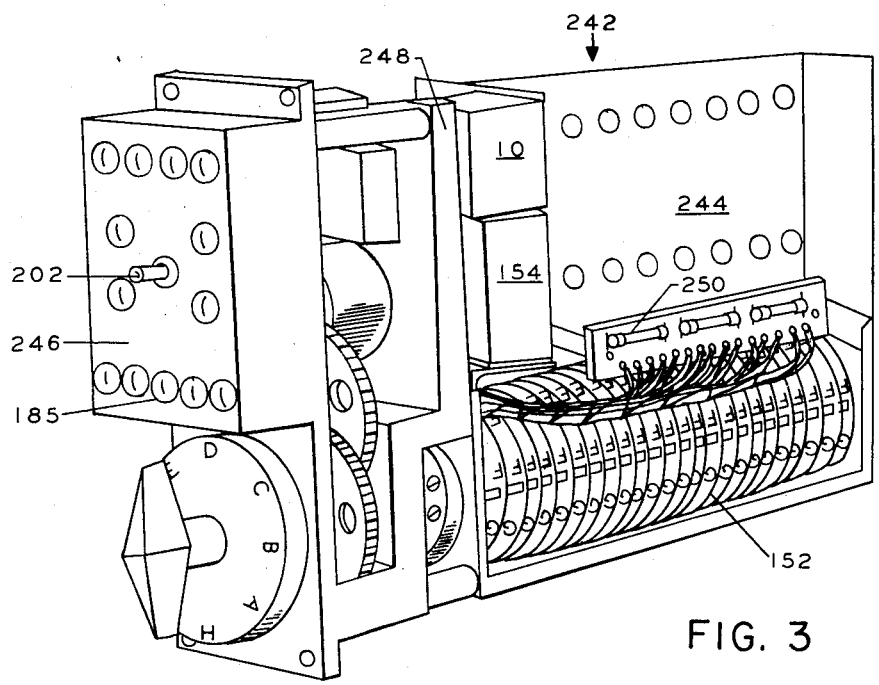
Fig. 3 is a right side perspective view of a U.S. Navy JY switch unit controlled by the circuit of Fig. 2 and having the transformer circuit arrangement of Fig. 1.
Figure 4:
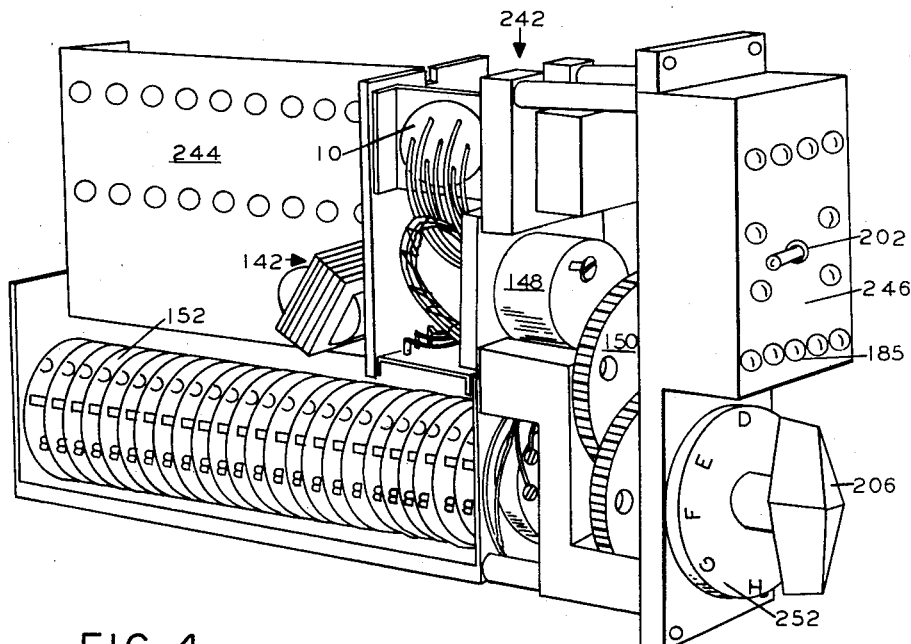
Fig. 4 is a left side perspective view of the device shown in Fig. 3.

Figs. 3 and 4 show the controlled unit of the Fig. 2 circuit with the parts thereof mounted on a common support 244 having a panel 246 at the front with motor 148 mounted on a vertical plate 248 together with relay 154 and unit 10. A common terminal block 250 receives the various wires. An indicator 252 behind knob 206 shows the position of control.

While we described one preferred embodiment of our invention in conjunction with one particular use to control the switching unit of a servo motor apparatus, this is not to be taken as any sort of limitation on the scope or use of our invention since other applications are readily made, and various alterations, variations, substitutions, eliminations, and/or changes may be made in the embodiments shown and described without departing from the scope of our invention shown in the appended claims.

We claim:

1. In a control device for electrical control from a remote point, a reference transformer having a secondary winding to be energized from a line voltage supply, a control phase winding to be energized from a control wire in response to changes in potential therein, a first secondary winding for said control phase winding, a second secondary winding for said control-phase winding, said first secondary winding being electrically connected with said secondary reference winding for additive phase relation thereto, said second secondary winding being electrically connected with said secondary reference winding for subtractive phase from said first secondary winding, rectifier means for said first secondary winding and said reference winding, and rectifier means for said second secondary winding and said reference winding, whereby changes in potential between said rectifier means from said control wire may be applied to unbalance a balanced electrical device for controlling a remote device.

2. In a control device for controlling a D.C. relay from an A.C. line to control a motor in response to changes from a remote point, an A.C. line having a variable control device energized by a basic phase therefrom, a controlled device energized by the basic phase from said line, a primary reference winding energized by said basic line phase, a secondary winding energized by said primary reference winding from said basic line phase, a control line from said control device to said controlled device, said control device varying selectively the potential in said control line, a control phase winding in said control line, a first secondary winding energized by said primary winding and being connected in phase with said secondary winding of said reference winding, a second secondary winding energized by said primary winding and being connected out of phase with said secondary winding of said reference winding, rectifier means for said first and second secondary windings, said in-phase potential being additive to said reference potential, said out-of-phase potential being subtractive from said reference potential, said unequal potentials being applied to said relay to unbalance same in a direction corresponding to the direction of movement of said control device, whereby said controlled device responds in the same direction thereby moving said controlled device by the shortest route.

3. In an electrical control device adapted to receive A.C. line current and to operate a D.C. polarized relay, a reference winding in said device energized from said line, a control phase primary winding energized by one phase of said A.C. line when changing from one position of control to another, a first secondary winding energized from said control phase winding in one potential and phase, and a second secondary winding energized from said control phase winding in the same phase, one of said secondary windings being electrically connected with said reference winding to be additive therewith, rectifier means for converting said additive voltage, said other secondary winding being electrically connected with said reference winding to be subtractive therefrom, rectifier means for converting said subtractive voltage, said additive voltage and said subtractive voltage being applicable to a balanced electrical element such as a polarized relay to unbalance same and the amount of said potential in one of the windings determining in which direction said relay will be unbalanced.

4. In a control device for controlling a D.C. balanced relay from an A.C. line by a single control wire, a means for varying potential from an A.C. line, a control wire connected with said means, a reference winding energized by said line and having a secondary winding energized thereby, a control phase winding connected with said control wire to receive any change of potential therein, a first secondary winding energized by said control phase winding in one phase direction with respect to said reference phase in response to the phase relation of a change in potential, a second secondary winding energized by said constrol phase winding out of phase with respect to the reference phase in response to the phase relation of a change in potential in said control wire, and means for rectifying said current produced in phase with said reference and said current produced out of phase with said reference, whereby said difference in current may be applied to unbalance a balanced D.C. electrical relay in one direction depending upon the total magnitude of the potential with respect to the phase of the reference winding.

5. In a remote control device, a reference winding for receiving voltage from the line and having a secondary reference winding therewith, said secondary winding having a first side and a second side, a control phase winding for receiving a control wire thereto, a first secondary winding having a first side and a second side, said secondary winding electrically connecting from the first side to the first side of said second reference winding, a first rectifier having a first input terminal and a second input terminal, said second side of said first secondary winding connecting electrically to one of said input terminals on said first rectifier, a second secondary winding having a first side and a second side, said first side of said secondary winding connecting electrically with the second side of said second reference winding, a second rectifier having first and second input terminals, said second secondary control winding having the second side thereof electrically connected with one of the input sides of said second rectifier, said secondary reference winding having the first side thereof electrically connected to said other input side of the second rectifier, said secondary reference winding having the second side thereof electrically connected to the other input side of said first rectifier, output terminals on said first rectifier, and output terminals on said second rectifier.

6. The device of claim 5 in a control circuit: a basic line voltage connected to said reference winding, a variable control device, a variable controlled device, a control phase wire between said control and said controlled device, said control phase winding being electrically connected in said control wire responsive to changes in potential therein, said control device being variable in one direction or the other to change potential in said control wire, one of said first or second secondary windings responding to said change in potential in said primary winding to be in phase with said reference winding thereby being additive therewith in potential, the other of said first or second secondary windings responding to the change in potential to be subtractive from said reference winding, the net voltage of the additive being rectified by one of said rectifiers, the net voltage of the subtractive being rectified by the other of said rectifiers, a balanced polarized relay having windings therein, said relay winding being electrically connected with said outlet terminals of said first and second rectifiers whereby the net additive is applied to one winding and the net subtractive to the other causing the relay armature to move to the stronger thereby unbalancing said relay in the direction corresponding to the movement of said control device to cause said controlled device to track it in the same direction, by virtue of which said controlled device reaches the same position as said control device thereby returning the potential in the control phase wire to neutral.

7. In a remote control device, a reference potential means deriving its potential from the line, said potential means having a first side and a second side, a control phase winding for receiving a control wire thereto, a first secondary winding having a first side and a second side, said secondary winding electrically connected from the first side to the first side of said potential means, a first rectifier having a first input terminal and a second input terminal, said second side of said first secondary winding connecting electrically to one of said input terminals on said first rectifier, a second secondary winding having a first side and a second side, said first side of said secondary winding connecting electrically with the second side of said potential means, a second rectifier having first and second input terminals, said second secondary control winding having the second side thereof electrically connected with one of the input sides of said second rectifier, said potential means having the first side thereof electrically connected to said other input side of the second rectifier, said potential means having the second side thereof electrically connected to the other input side of said first rectifier, output terminals on said first rectifier, and output terminals on said second rectifier.

References Cited in the file of this patent
UNITED STATES PATENTS

| | | |
|---|---|---|
| 2,399,675 | Hays | May 7, 1946 |
| 2,437,603 | Hornfeck | Mar. 9, 1948 |
| 2,473,494 | Wannamaker | June 14, 1949 |
| 2,592,825 | Rutenberg | Apr. 15, 1952 |